(12) United States Patent
Kress

(10) Patent No.: US 9,073,130 B2
(45) Date of Patent: Jul. 7, 2015

(54) DRILL

(75) Inventor: Dieter Kress, Aalen (DE)

(73) Assignee: Mapal Fabrik für Präzisionswerkzeuge Dr. Kress KG, Aalen (DE)

( * ) Notice: Subject to any disclaimer, the term of this patent is extended or adjusted under 35 U.S.C. 154(b) by 561 days.

(21) Appl. No.: 13/498,637

(22) PCT Filed: Sep. 29, 2010

(86) PCT No.: PCT/EP2010/005938
§ 371 (c)(1),
(2), (4) Date: Mar. 28, 2012

(87) PCT Pub. No.: WO2011/038896
PCT Pub. Date: Apr. 7, 2011

(65) Prior Publication Data
US 2012/0183367 A1  Jul. 19, 2012

(30) Foreign Application Priority Data

Oct. 2, 2009 (DE) .......................... 10 2009 049 087

(51) Int. Cl.
*B23B 51/02* (2006.01)
(52) U.S. Cl.
CPC .............. *B23B 51/02* (2013.01); *Y10T 408/81* (2015.01); *Y10T 408/9095* (2015.01); *Y10T 408/89* (2015.01); *Y10T 408/909* (2015.01); *B23B 2226/27* (2013.01); *B23B 2226/275* (2013.01); *B23B 2251/44* (2013.01)
(58) Field of Classification Search
CPC ................ B23B 2200/3672; B23B 2200/446; B23B 2200/44

USPC .................................. 408/144, 227, 229, 230
See application file for complete search history.

(56) References Cited

U.S. PATENT DOCUMENTS

| 2,084,737 | A | * | 6/1937 | Magnus ........................ 408/230 |
| 3,667,857 | A | * | 6/1972 | Shaner et al. ................. 408/230 |
| 4,561,813 | A | * | 12/1985 | Schneider ..................... 408/230 |
| 5,921,728 | A | * | 7/1999 | Kammeraad et al. ......... 408/227 |
| 6,923,602 | B2 | * | 8/2005 | Osawa et al. ................. 408/230 |

(Continued)

FOREIGN PATENT DOCUMENTS

| CN | 101524768 A | 9/2009 |
| DE | 20209768 U1 | 11/2003 |

(Continued)

OTHER PUBLICATIONS

Hufschmied product brochure, Germany, 2007.

(Continued)

*Primary Examiner* — Daniel Howell
*Assistant Examiner* — Alan Snyder
(74) *Attorney, Agent, or Firm* — Harness, Dickey & Pierce, P.L.C.; Stephen T. Olson

(57) ABSTRACT

A drill for producing a drilled hole in work pieces has at least one main cutting edge on an end face. At least one secondary cutting edge is provided in the region of a circumferential surface of the drill. At least one circularly ground land circumferentially adjoins the at least one secondary cutting edge. The circularly ground lands extend over a first longitudinal section in the front area of the secondary cutting edge. In a following second longitudinal section, a secondary flank circumferentially adjoins the secondary cutting edge.

26 Claims, 4 Drawing Sheets

(56) References Cited

U.S. PATENT DOCUMENTS

Figure 1:
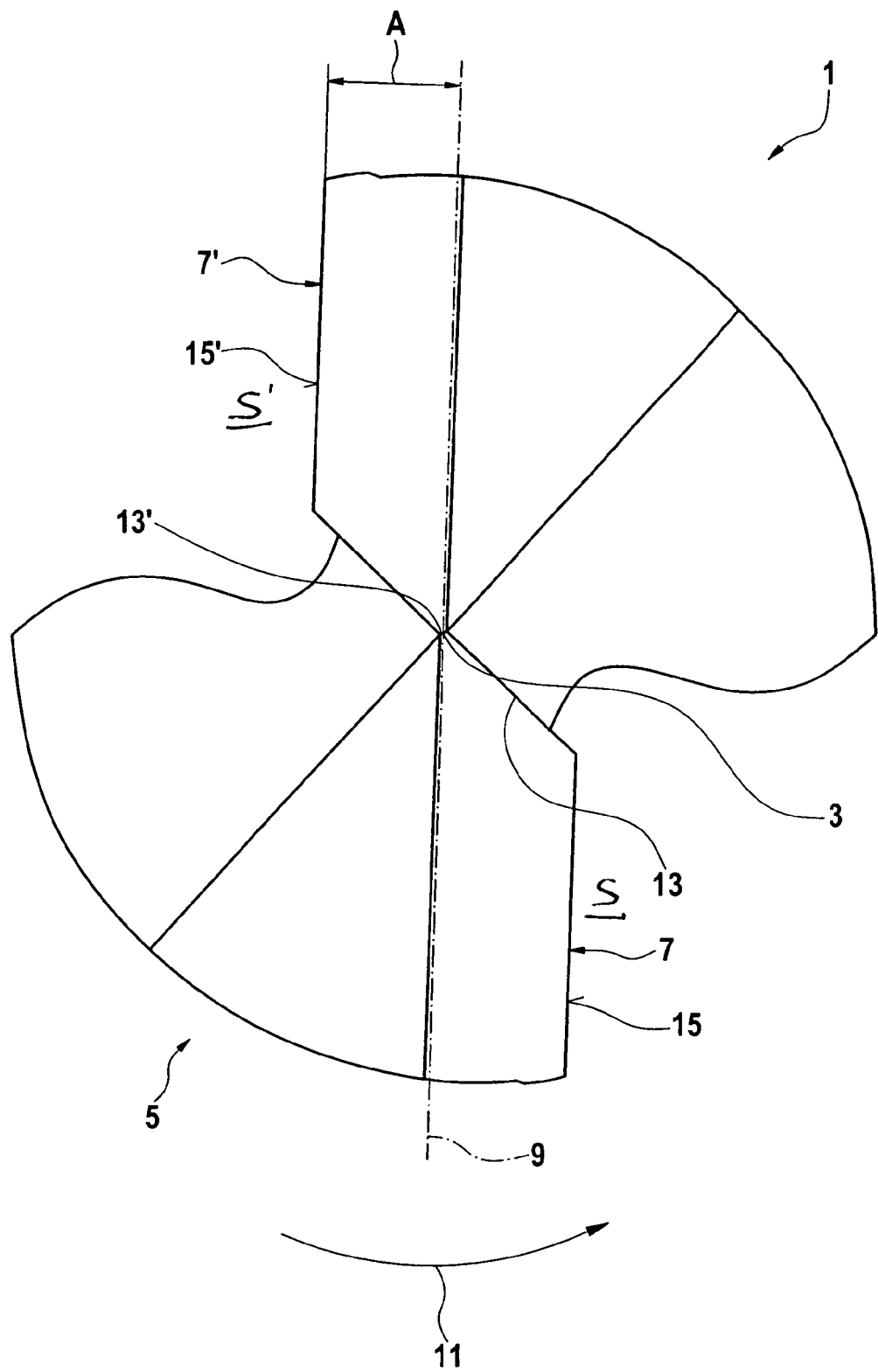

| | | | |
|---|---|---|---|
| 7,575,401 B1 | 8/2009 | Garrick et al. | |
| 2005/0249562 A1 | 11/2005 | Frejd | |
| 2008/0019787 A1* | 1/2008 | Sampath et al. | 408/230 |
| 2009/0279965 A1* | 11/2009 | Soittu | 408/59 |

FOREIGN PATENT DOCUMENTS

| | | |
|---|---|---|
| DE | 20304580 U1 | 9/2004 |
| EP | 0137898 A1 | 4/1985 |
| JP | 55150905 A | 11/1980 |
| JP | 2009172708 A | 8/2009 |
| WO | WO 2004/082874 A1 | 9/2004 |

OTHER PUBLICATIONS

Opposition to patent DE 10 20099 0499 087 B4.
German PTO Office Action dated Jul. 31, 2012.
Letter to German Patent Office dated Aug. 5, 2011.
International Search Report for PCT/EP2010/005938, ISA/EP, Rijswijk, NL, mailed Dec. 28, 2010.
CN Office Action in parallel application CN 201080054566.2, dated Aug. 8, 2014, with English translation thereof.

* cited by examiner

DRILL

This application is a 371 U.S. National Stage of International Application No. PCT/EP2010/005938, filed Sep. 29, 2010, which claims priority to German Patent Application No. 10 2009 049 087.6, filed Oct. 2, 2009. The entire disclosures of the above applications are incorporated herein by reference.

The invention relates to a drill for producing a drilled hole in work pieces comprising fiber-reinforced plastic in accordance with the preamble of claim 1.

When machining work pieces that comprise fiber-reinforced plastic, for example plastic that is reinforced with glass fiber or carbon fiber, it is important, among other things, that the cutting edges of the fibers are cleanly cut off and not torn out of the material composite. Unclean edges, meaning frayed edges with protruding fibers, cause high complexity and, therefore, high reworking costs and may render machined work pieces even unusable. When drilling such work pieces, especially at the point of exit of the bore hole, which is where the drill penetrates the work piece, frayed edges occur, so-called delamination. When drilling rivet holes in structural parts that are used in aircraft construction, for example, this is very inconvenient.

DE 202 09 768 U1 discloses a drill of the kind as mentioned above. On its end face, said drill includes two main cutting edges that transition into secondary cutting edges disposed on the circumference of the drill. Chip and flank regions located adjacent to each other constitute the main cutting edges. The removed shavings are carried away along the chip regions. A chisel edge is disposed herein in the area of the center axis of the drill relative to which the two end face cutting edges adjoin. Secondary cutting edges with positive rake angle are disposed on the circumferential surface of the drill, and wherein each main cutting edge is associated with one secondary cutting edge. To prevent delamination—even when machining harder layers of the work piece—the drill comprises in its point area a pilot section having a smaller diameter, followed by a fine-machining section working against the drilling direction of the drill. The secondary cutting edges that are provided on the fine-machining section are adjoined around the circumference by a circularly ground land that serves for centering and supporting the drill against the wall of the bore hole during the drilling process. The width of the circularly ground land increases linearly parallel to the increasing distance relative to the main cutting edges. It is disadvantageous, however, that the drilling result does not always fulfill the requirements with regard to surface quality and the geometrical accuracy of the bore hole and is, therefore, deserving of improvement. Furthermore, the complexity and the related costs that are involved in the production of the drill are quite extensive.

Therefore, it is the object of the present invention to provide a drill of the kind as specified in the introduction that will not cause delamination, meaning a separation of fibers, in work pieces containing fiber-reinforced plastics, in particular at the exit of the bore hole, and that can be used for generating accurate bore holes as well as good surface qualities of the wall of the bore hole.

To achieve this object, a drill is proposed that has the characteristics as specified in claim 1. Said drill comprises at least one end-face cutting edge that is adjoined in the region of the circumferential surface by a secondary cutting edge. On the side of the circumference, the secondary cutting edge is followed by an adjoining circularly ground land. The drill is characterized in that the circularly ground land extends over a first longitudinal section in the front region of the secondary cutting edge, and in that in a following second longitudinal section a secondary flank circumferentially adjoins the secondary cutting edge. In its longitudinal extension, the secondary cutting edge is thus subdivided into two regions and/or longitudinal sections. In the first, front—axially adjoining the drill point—region and/or longitudinal section of the secondary cutting edge, the circularly ground land is provided between the secondary cutting edge and its associated flank. In the second region and/or longitudinal section of the secondary cutting edge, which adjoins the first longitudinal section in the direction of the shaft of the drill, the secondary flank that is associated with the secondary cutting edge adjoins thereto; thereby resulting in the longitudinal sections are various transitions from the secondary cutting edge to the associated flank region and/or secondary flank region.

The first longitudinal section of the secondary cutting edge serves, on the one hand, for cutting fibers during drilling actions in fiber-reinforced plastics. On the other hand, the radius of the circularly ground land is preferably adjusted to the machining diameter of the drill. Correspondingly, based on the circularly ground land in the first longitudinal section, there results a support contact region between the circularly ground land and the wall of the bore hole. The drill is thus supported and guided, whereby it is possible to produce exact bore holes of a high surface quality.

Depending on the composition of the work piece comprising the fiber-reinforced plastic, it is possible that not all fibers are cut by the first longitudinal section of the secondary cutting edge. Therefore, it is advantageous if, in the following longitudinal section, a secondary flank adjoins thereto along the circumference. Still remaining fibers can be reliably cut in this second longitudinal section of the secondary cutting edge thus achieving a high surface quality of the bore hole. This way, any delamination of the layers or fraying of the edges of a work price comprising such fibers, in particular in the exit area of the drill, is thus avoided.

It is especially preferred for the transition from the secondary cutting edge to the secondary flank in the second longitudinal section to be configured as a sharpening. The secondary cutting edge thus transitions immediately or directly into the secondary flank. Due to this sharpening it is now possible to reliably cut individual fibers that were not cut in the region of the first longitudinal section in the region of the second longitudinal section.

Preferably, the drill consists of two main cutting edges and two secondary cutting edges that are associated with the same, including respectively one circularly ground land in the first longitudinal section, as previously described. It is also conceivable, however, for the drill to have—as explained above—only one main cutting edge and only one secondary edge associated to the same with the adjoining circularly ground land as described above. Naturally, it is also possible to provide more than two, for example three or four, main cutting edges that are associated each with one secondary cutting edge, which are configured along the circumference, as indicated above. The secondary cutting edges can extends helically or parallel relative to an axis of rotation of the drill. In both instances, it is especially preferred for the main cutting edges to be disposed centrosymmetrically in relation to the axis of rotation of the drill.

Especially preferred is an embodiment of the drill in which a width of the circularly ground land is minimal in the first longitudinal section, preferably a technically feasible minimum. Although there exists only a very small support contact area between the circularly ground land and the wall of the bore hole, such a narrow circularly ground land achieves a sufficient level of support and guidance, and thereby the stabilization of the cutting edges of the drill. Thus, despite the minimal width of the circularly ground land, exact bore holes of high surface quality with small bore tolerances are ensured. Moreover, the wear and tear on the drill is minimal, whereby a long service life can be achieved for the drill.

An especially preferred embodiment of the drill is characterized in that the width of the circularly ground land is in a range of 0.01 mm to 0.1 mm. It has been shown that circularly ground lands having a width of 0.05 mm allow for achieving especially good results.

An improvement of the invention provides that the drill is provided with a hard coating at least in the region of the circularly ground land. Preferably, the same can be a diamond coating that protects the circularly ground land but also the associated cutting edge against wear and tear, as well as chipping.

An embodiment of the drill in which the length of the circularly ground land, which is disposed on the first longitudinal section of the secondary cutting edge, is in a range of 1.0 mm to 3.0 mm is especially preferred. Such a length of the circularly ground land is already sufficient for good support and guidance of the drill.

It is especially preferred therein for the width of the circulatory ground land to be constant or essentially constant over its length. By means of this constant or essentially constant width of the circulatory ground land, it is possible to achieve an even support of the drill on the wall of the bore hole.

Also preferred is an embodiment of the drill having a circularly ground land that becomes narrower from the front-end region of the first longitudinal section against the drilling direction of the drill and/or toward the rear in the direction of a chucking region of the drill. This way, very good support as well as very good cutting action are achieved in the first longitudinal section of the secondary cutting edge.

Yet another preferred embodiment of the drill provides that the secondary cutting edge features at least one recess that is open toward the edge. The recess can preferably be configured as a notch, which is, for example, applied by means of cutting action, laser action and/or that is eroded into the secondary cutting edge. On the one hand, said recess serves, so to speak, to capture fibers in the work piece that are located before the recess and that were not cut previously; they are now safely cut by means of the secondary cutting edge. On the other hand, the secondary cutting edge not only cuts the material at the wall of the bore hole by means of the secondary cutting edge; but, due to the elasticity of the material, it also displaces and/or compresses said material to a certain extent. In the region of the recess, the material can relax; and in the following steps, it is possible for the secondary cutting edge to cut any protruding fibers thus achieving high surface quality without delamination.

An improvement of the invention provides that the secondary cutting edge is provided with multiple recesses that are open toward the edge and disposed at a distance relative to each other. This ensures that any fibers that are present in the work piece and that were not captured in the first recess, seen in the drilling direction of the drill, and cut by the secondary cutting edge section that is disposed between two adjacently disposed recesses will be captured by the next recess or another one thereafter and subsequently cut. The operating result of the drill can thus be further optimized.

A preferred embodiment of the drill provides that the longitudinal extension (depth) of the recesses is in the range of 0.1 mm to 0.8 mm. It has been shown that especially good operating results of the drill can be achieved with recesses having a longitudinal extension of 0.1 mm to 0.5 mm, particularly 0.15 mm.

It is especially preferred therein if at least one of the recesses is disposed on the secondary cutting edge in the region of the second longitudinal section.

According to one improvement of the invention it is envisioned that the main cutting edge extends parallel or essentially parallel in relation to a straight line intersecting the axis of rotation of the drill having a distance advancing—in the direction of rotation of the drill—relative to said straight line of 10% to 20%, preferably approximately 15%, of a main drilling diameter of the drill. Thus, it is preferred for the main cutting edge of the drill to be located on a straight line that is arranged parallel or essentially parallel at a distance in relation of the imaginary diameter line of the drill. The main cutting edge therein is to be disposed, advancing in the direction of rotation of the drill, meaning in the turning direction of the drill, that the same describes in the cutting direction. The distance between the straight line and the main cutting edge is 10% to 20%, preferably 15%, of the main drilling diameter of the drill. The main drilling diameter designates the machining diameter of the drill, meaning the diameter of the drill at the transition between the main and secondary cutting edges. By offsetting this main cutting edge in this way, it is possible to achieve especially good operating results.

An especially preferred embodiment of the drill provides that the main cutting edges that are essentially disposed across from each other enclose a point angle that is smaller or equal 100° is, preferably smaller or equal 90°. By configuring the face-end drill end in this way, it is possible to avoid the usually occurring delamination of the material that is to be machined at the point of the drill.

One preferred embodied example provides that the drill comprises a chisel edge that is created by thinning the face-end drill point and that connects the main cutting edges with each other. Said edge is preferably rendered smaller size by crosswise drill point thinning. This way, it is possible to reduce the drilling pressure and drilling moment.

A preferred embodied example provides that, in a drill of the kind as described in the introduction, a chip groove is associated with the at least one secondary cutting edge, and that the same provides at least regionally for an extra groove so that a chipping angle of the at least one secondary cutting edge is enlarged in the region of the additional groove. This way, the secondary cutting edge is sharpened, independently of any relatively small flank angle or a circularly ground land, whereby fibers of fiber-reinforced plastic materials are safely cut. Frayed edges as well as delamination are safely avoided; and the drill is optimally supported therein against the wall of the bore hole.

Especially preferred is a drill on which the extra groove is provided, at any rate, on the at least one secondary cutting edge with an adjoining circularly ground land. In fact, any such secondary cutting edge is not very sharp due to the disappearing flank angle, whereby there is the risk that the fibers that protrude into the inside of the bore hole are only bent or torn out of the material. But if an extra groove is provided in the present instance, the corresponding secondary cutting edge is supported by its circularly ground land on the wall of the bore hole and is, simultaneously, sharpened due to the enlarged chipping angle thus ensuring that the fibers are safely cut off.

A preferred drill is a drill that has the extra groove—seen in an axial direction—disposed in the region of the circularly ground land. This is preferred, in particular, in instances when the circularly ground land does not extend over the entire length of the drill. The secondary cutting edge that is associated with the circularly ground land is not very sharp especially in these regions. Using the extra groove, the same can be especially sharpened in a preferred manner by means of the extra groove.***

Figure 2:
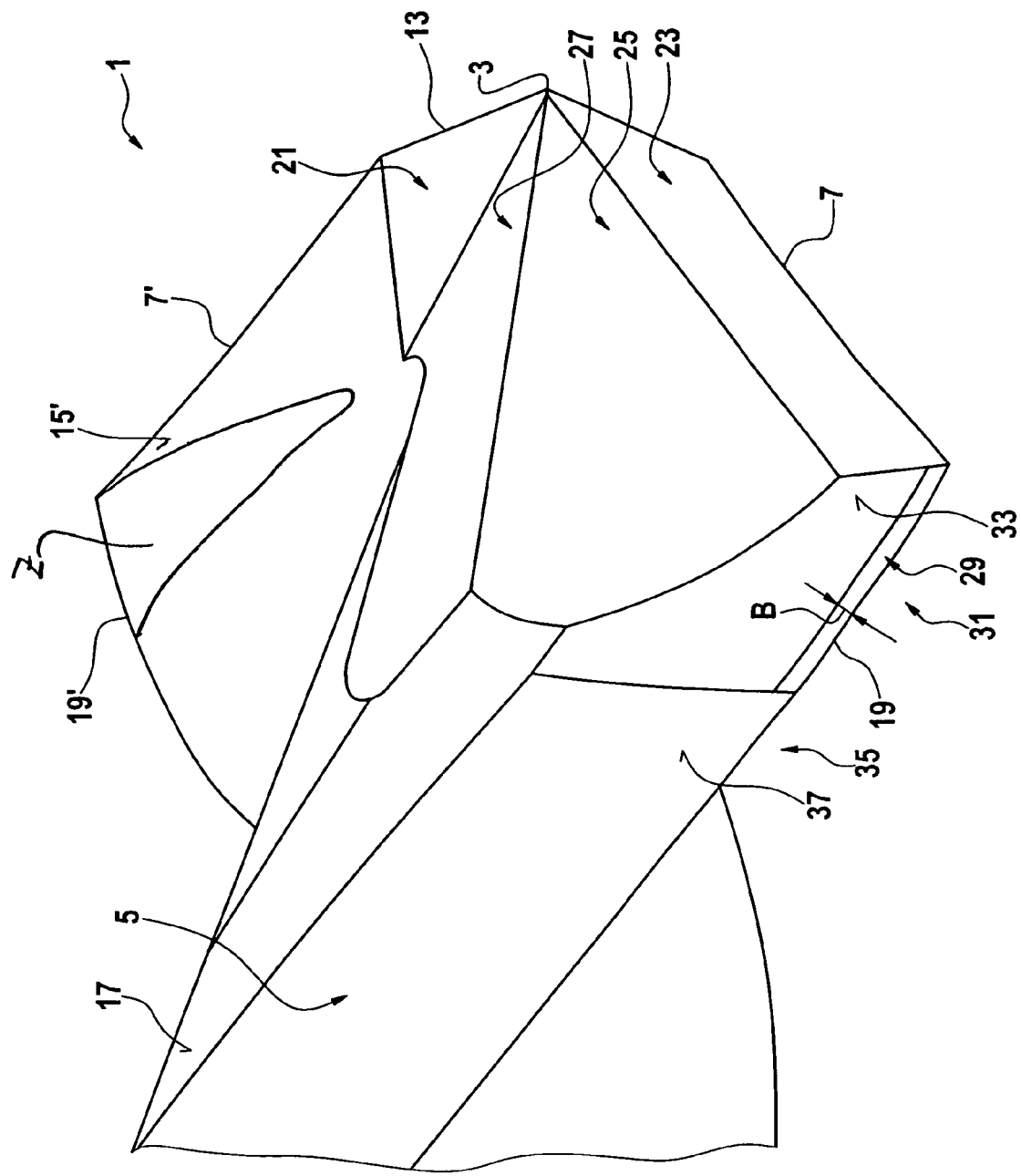
Figure 3:
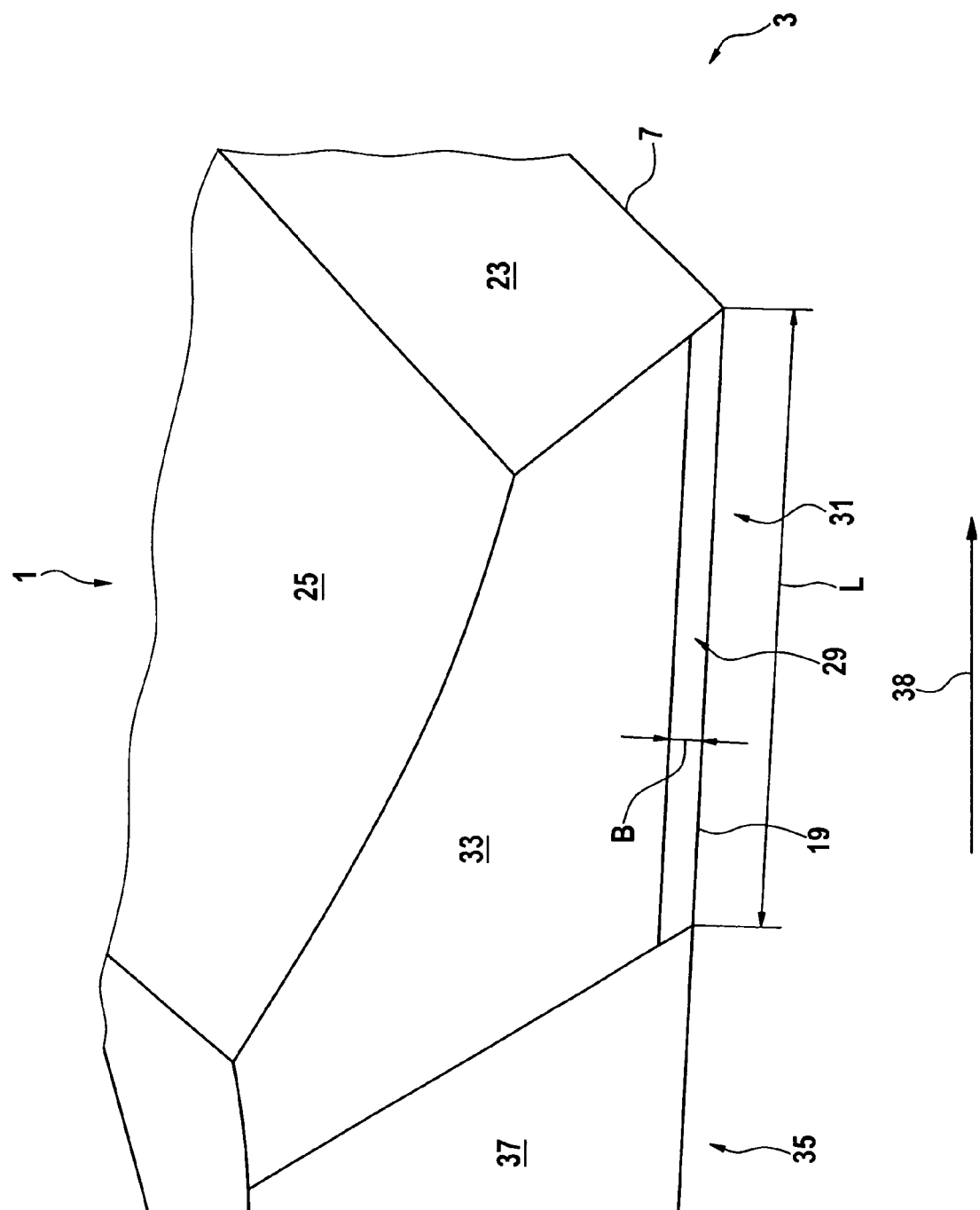
Figure 4:
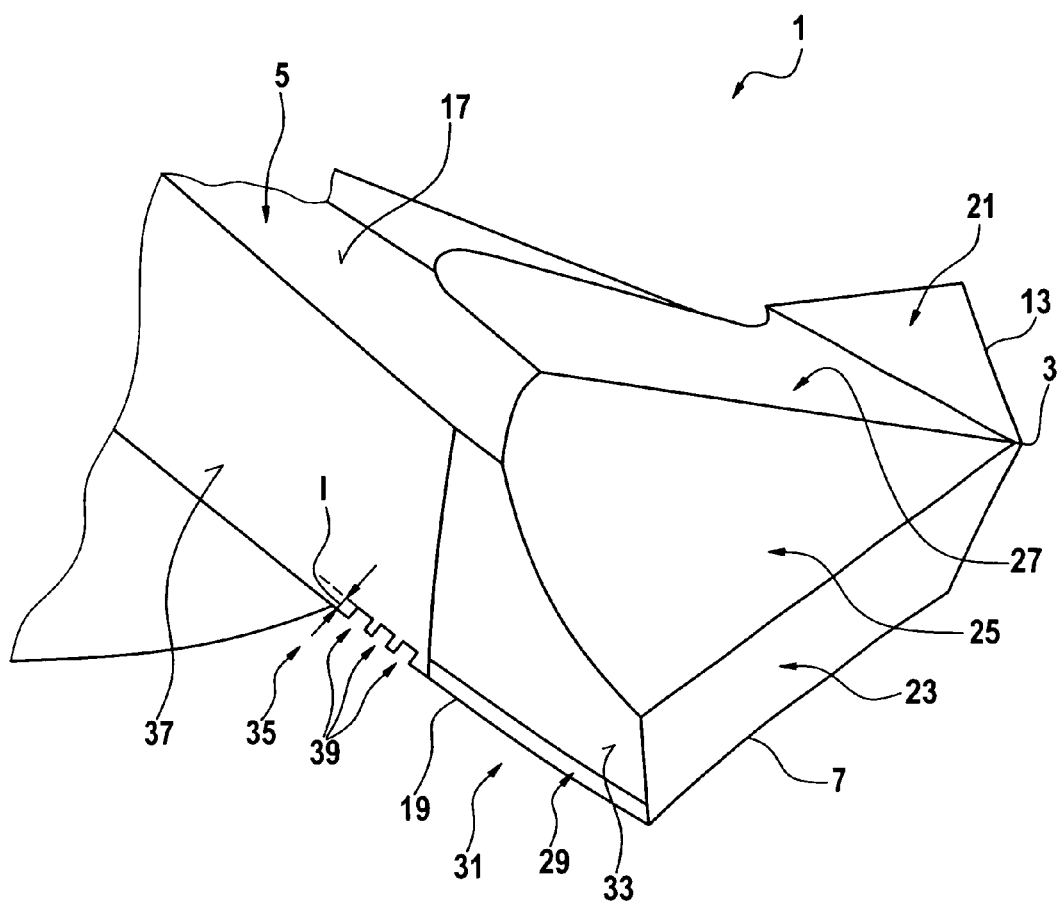

The invention will now be described in further detail. Shown are in:

FIG. 1 a schematic top view on the point area of a first embodiment of a drill;

FIG. 2 a perspective side view of a part of a modified drill;

FIG. 3 an enlarged section of the drill according to FIG. 2 in the area of its point with a view toward the secondary cutting edge; and FIG. 4 a perspective side view of a part of a second embodiment of a drill.

FIG. 1 shows a schematic top view of a first embodiment of a drill 1. the view is directed from above onto point 3 of drill 1.

Drill 1 includes a base body 5 that is provided with a first main cutting edge 7 and a second main cutting edge 7', with the same being disposed centrosymmetrically relative to the axis of rotation of the drill 1 extending through the point 3. The two main cutting edges 7, 7' are disposed parallel in relation to an imaginary straight line 9 corresponding to a diameter line and extending through the axis of rotation. A distance A between the straight line 9 and the main cutting edges 7, 7' is approximately 15% of the main drilling diameter of the drill 1. The main drilling diameter is the diameter of the drill 1 as measured between the points of the main cutting edges 7, 7' located at the greatest radial distance from the axis of rotation. Said points advance ahead of the straight line 9 in the direction of rotation of the drill 1, which is indicated by arrow 11. The direction of rotation is the direction in which the drill turns during the machining of a work piece in order for the cutting edges to remove material from the work piece.

In this embodiment, the two main cutting edges 7, 7' are preferably connected by a chisel edge 13 that essentially runs through the axis of rotation and connects the two main cutting edges 7, 7' by means of a central chisel edge 13' cutting the point 3.

One cutting face 15, 15' of a chip groove S,S' each is associated with the main cutting edges 7, 7' by means of which the chippings glide off that were removed by the main cutting edges 7, 7'.

FIG. 2 shows a section of drill 1 represented in a perspective side view. Same and functionally identical parts are identified by the same reference numbers; reference is being made regarding this point to the description of FIG. 1.

The drill depicted in the present drawing is configured as a helical or twist drill, also comprising a base body 5 with the main cutting edges 7, 7' provided thereon and that are connected to each other by means of a chisel edge 13. They enclose an angle with each other that is generally designated as a point angle and smaller or equal 100°, preferably smaller or equal 90°. This is why the end of the drill 1 carrying the main cutting edges 7, 7' is relatively pointed.

Of the cutting faces 15, 15' that are associated with the main cutting edges 7, 7', only the second cutting face 15' that is associated with the second main cutting edge 7' is presently visible. When the drill 1 is turned in the direction of rotation, as depicted by means of arrow 11 in FIG. 1, the second main cutting edge 7' moves out of the plane of the representation in FIG. 2, while the first main cutting edge 7 is shifted to inside the plane of the representation.

In the region of the circumferential surface 17 of the drill 1, the main cutting edges 7, 7' transition into the secondary cutting edges 19, 19'. In straightly grooved drills, these are aligned essentially parallel in relation to the axis of rotation of the drill. However, in the embodiment as shown herein, they extend along an imaginary helical line.

In order to improve the cutting properties of the drill 1 in the area of the chisel edge 13, which is achieved by pointing—meaning a special grinding technique—, the chisel edge 13 should be as short as possible. This is achieved, in particular by so-called crosswise pointing 21. Due to the thus reduced or shortened chisel edge 13, the necessary drilling pressure and thereby the drilling moment are reduced.

Main flank surfaces 23 and 25 as well as pointing area 27 are provided in the area of the face-end side of the drill 1; however, these aspects shall not be discussed in further detail herein.

The secondary cutting edges 19, 19' are each adjoined circumferentially by a circularly ground land 29; of this, the representation in FIG. 2 only shows the circularly ground land 29 that is associated with the secondary cutting edge 19. Since the circularly ground lands 29 and the secondary cutting edges 19, 19' are typically configured identically, only the circularly ground land 29 and the secondary edge 19 shall be discussed in further detail below.

In this embodiment, the circularly ground land 29 extends over a first longitudinal section 31, starting on the front end of the secondary cutting edge 19 in the direction of a shaft of drill 1, which is not shown. Circumferentially adjoining this circularly ground land 29 having a width B is a flank 33.

In a second longitudinal section 35 of the secondary cutting edge 19 that adjoins the first longitudinal section 31 in the direction of the shaft of the drill 1, the secondary cutting edge 19 transitions directly into a secondary flank 37. Presently, the secondary cutting edge 19 is sharpened in the region of the second longitudinal section 35.

The circularly ground land 29 has a radius corresponding to the radius of the bore hole that is to be created, meaning half the machining diameter of the drill 1. A ground surface of the drill 1, whereby the flank is created, determines the desired width B of the circularly ground land 29. The courses of the flank 33 and of the secondary flank 37 are selected in such a way that the same do not touch the wall of the bore hole in a work piece during a drilling operation by the drill 1.

Preferably, an extra groove Z is provided at least in the cutting face 15' of chip groove S'. Thus, the same is preferably incorporated in the wall area of the chip groove S' that constitutes a cutting face 15' associated with the secondary cutting edge 7'. This way, the rake angle of the secondary cutting edge 7' is enlarged in the area of the extra groove Z, meaning the secondary cutting edge is sharpened in this region and able to safely cut any fibers protruding into the interior of the bore hole. It is also possible to provide the at least one extra groove Z in the region of the chip groove S of the secondary cutting edge 7, which is not shown here. Preferably, however, an extra groove Z is provided, at least regionally, in each of the chip grooves S, S'. This allows the two secondary cutting edges 7, 7' to fulfill their supporting function in the region of the circularly ground land 29 that is associated to them, and wherein they are, simultaneously, sharpened in the regions of their extra grooves Z, whereby they are able to safely cut off any protruding fibers.

If more than one secondary cutting edge is provided for drill 1, providing the extra groove Z is preferred, at least specifically at the at least one secondary cutting edge to which is adjoined—viewed in circumferential direction—a circularly ground land. In this instance especially, it is advantageous to provide a sharp edge on the secondary cutting edge with the aid of the extra groove because otherwise the same would be configured as not very sharp in this region. On other secondary cutting edges, however, that may not include a circularly ground land, it is not absolutely necessary to provide an extra groove. But it is surely possible to provide an extra groove herein as well.

The extra groove is most preferably—viewed in axial direction—disposed in the region of the circularly ground land. Thus, the circularly ground land does not extend over the entire axial length of the secondary cutting edge, which is especially preferably sharpened in the region where it would otherwise only be aligned as not very sharp due to the circularly ground land.

Due to the extra groove Z, the rake angle of the secondary cutting edges 7, 7' is enlarged in this region. This will be described in further detail below.

Generally, the wall of the bore hole and the circumferential surface of the drill 1, which is located—seen in the direction of the center axis of the drill, meaning in radial direction—opposite in relation to the same and adjoins—seen in circumferential direction—the secondary cutting edge, together enclose a flank angle. The corresponding region of the circumferential surface is then configured as a flank. In the region of the circularly ground land, the flank angle approaches zero or is even equal zero. At any rate, it is at most a minimal, positive value. In this case, the drill 1 is supported by the circularly ground land 29 against the wall of the bore hole.

If an extra groove Z is now incorporated in the cutting face 15 of a chip groove S, there results a highly positive rake angle for the associated secondary cutting edge 7. Thus, the same is sharpened by the extra groove Z, even if circularly ground lands are provided in the region of the associated secondary cutting edge.

Therefore, if a secondary cutting edge is sharpened by providing extra grooves Z, it is possible—seen in circumferential direction—for a circularly ground land 29 to easily adjoin the associated secondary cutting edge 7 so that the drill 1 is able to optimally support itself against a wall of a bore hole.

In the event that extra grooves Z are provided on a drill 1, it is not necessary that they extend—viewed in the longitudinal direction—over the same region as the circularly ground land 29. In particular, it is possible for the extra grooves Z to be envisioned only in a certain region or in certain regions of the secondary cutting edges 7, 7' and/or circularly ground lands 29, 29'. Especially on long drills, it is possible to provide the extra grooves Z—viewed from the end face of the drill 1—only in a first region. Preferably, it is ensured therein that all protruding fibers are cut off by the sharpened secondary cutting edges in the region of the extra grooves. It is then no longer necessary that—viewed in axial direction—the subsequent region of the secondary cutting edges 7, 7' is sharpened.

Preferably, the extra grooves extend essentially parallel or exactly parallel in relation to the chip grooves.

FIG. 3 shows an enlarged section of the drill 1 according to FIG. 2 in the region of its point 3 with the glance in the direction of the secondary cutting edge 19. Same and functionally identical parts are identified by the same reference numbers. Reference is being made herein to the description of the preceding figures.

Width B of the first longitudinal section 31 is preferably in a range of 0.01 mm to 0.1 mm and is, in particular, approximately 0.05 mm. The length L of the first longitudinal section 31 therein is very short in relation to an overall length of the drill 1, preferably in a range of 1 mm to 3 mm. The second longitudinal section 35 preferably extends over the—viewed in the drilling direction—remaining region of the secondary cutting edge 19 located behind the circularly ground land 29.

In the embodiment as shown herein, the width B of the circularly ground land 29 is constant over its length L. In the alternative, it is preferred for the width B of the circularly ground land 29 to become narrower from the face-end region of the first longitudinal section 31, which adjoins the main cutting edge 7, toward the drilling direction 38, as depicted by the arrow.

FIG. 4 depicts a perspective side view of a further embodiment of a drill 1. This view corresponds essentially to the representation according to FIG. 2. Same and functionally identical parts are identified by the same reference numbers, and reference is being made to the description of the previous figures.

In the especially preferred embodiment of the drill 1 as represented in FIG. 4, it is provided that the secondary cutting edges 19, 19' each include several—herein a total of three—recesses 39 that are open toward the edge and disposed at a distance relative to each other. The same are presently preferably disposed in the second longitudinal section 35 of the secondary cutting edge 19, 19'. It is also conceivable to dispose one or several recesses, in place of the former or in addition to the previously described recesses 39, in the region of the first longitudinal section 31.

The recesses 39 are configured as notches that have, by way of a purely exemplary contour, a rectangular profile in the embodiment. They are created by grinding or laser action and/or eroding action. It is easily possible to provide a differently configured contour for the recess 39. Said recesses can, for example, be V-shaped or shaped otherwise. Such recesses have proved especially advantageous that have—viewed in the circumferential direction—a longitudinal extension I in a range of 0.1 mm to 0.8 mm, especially 0.1 mm to 0.5 mm, preferably 0.15 mm. The recesses 39 are able to capture fibers that protrude from the work piece that is to be machined; and said fibers are subsequently cut, if necessary between two recesses 39, by a partial region of the secondary cutting edge 19, 19' that follows in axial direction. In addition, the material that was compressed by the preceding region of the secondary cutting edge 19, 19' is able to relax again, and the fibers that have thus been loosed can subsequently be cut by the secondary cutting edge 19, 19'.

In summary, it can be stated that using the drill 1, which has been described based on the figures herein, it is possible to avoid delamination as well as frayed machining edges when drilling a work piece made of a fiber-reinforced plastic, especially at the bore hole exit. This is possible for work pieces made completely of fiber-reinforced plastic as well as such that comprise at least one layer of fiber-reinforced plastic and a metal layer, especially aluminum. When such work pieces having a sandwich-type structure are machined, the previously described advantages become manifested especially when fiber-reinforced plastic is present at the exit side of the drill 1 from the work piece. It is further advantageous that a possibility is provided for generating very precise bore holes with good surfaces. This is achieved, in particular, by the very narrow circular ground land 29 that extends only over a minimal axial length of preferably approximately 1.0 mm to 3.0 mm. Due to the fact that the former is configured as very narrow, the drill 1 reliably cuts the fibers of the work piece. In this process, the circulatory ground land 29, which glides along the wall of the bore hole thereby stabilizes the secondary cutting edge 19, 19' and is subject only to minimal wear and tear. Especially good results have been achieved when the drill 1 had, aside from the special configuration of the circularly ground land 29, a point angle that is smaller or equal 100°, especially a point angle of smaller or equal 90°. By this small point angle that the main cutting edges 7, 7' enclose between each other, it is ensured that the resulting force components acting upon the drill 1 are as small as possible in the axial direction.

The herein depicted embodiments of the drill 1 with the secondary cutting edge 19, 19', which has a circularly ground land 29 in the first longitudinal section 31 and is sharpened in the second longitudinal section 35, result in very good operating results especially if the fibers of the work piece were not completely cut by the secondary cutting edges 19, 19' in the region of the first longitudinal section 31. In this case, the second longitudinal section 35 of the secondary cutting edge 19, 19' serves, in particular, for safe cutting action of these fibers. If the drill 1 is used in connection with a work piece whose fibers are especially difficult to cut such as, for example, because they are very fine fibers, it is advantageous to provide, additionally, one or several recesses 39 that capture these fibers so that they are cut by an adjoining region of the secondary cutting edge 19, 19'. This way, it s also possible to machine materials on which not all fibers are cut by the use of a conventional drill.

For bore holes in work pieces of fiber-reinforced plastic, whose fibers are less difficult to cut it is also preferred to configure the transition from the secondary cutting edge 19, 19' to the secondary flank 37 in the second longitudinal section 35 not as sharpened but as a second circularly ground land. The diameter of this second circularly ground land then corresponds preferably also to the machining diameter of the drill 1, wherein the width of the same is preferably wider by a multiple factor than that of the circularly ground land 29 of the first longitudinal section 31. This way, it is possible to achieve better supporting and guiding actions of the drill 1 in the region of the second longitudinal section 35. If a second circularly ground land is provided in the region of the second longitudinal section 35 of the secondary cutting edge 19, 19', the fibers of the work piece that is to be machined are essentially cut in the region of the first longitudinal section 31. Due to the fact that, preferably, the width B of the circularly ground land 29 of the first longitudinal section 31 is very small, the secondary cutting edge 19, 19' in fact already achieves a very good cutting action in the region of the first longitudinal section 31. Therefore, especially for work pieces whose fibers are reliably cut already in the region of the first longitudinal section 31, the second circularly ground land is preferably provided in the region of the second longitudinal section 35 of the secondary cutting edge 19, 19'.

In this context, it is also especially preferred that the open recesses 39 are provided in the region of the secondary cutting edge 19, 19'. In particular, if the same are disposed in the region of the second longitudinal section 35 of the secondary cutting edge 19, 19', fibers that were not cut in the first longitudinal section 31 will be captured by the recesses 39 and reliably cut off in the region of the second longitudinal section 35.

Furthermore, it is also conceivable to provide sharpening in at least one partial section of the second longitudinal section 35 that adjoins the first longitudinal section 31 and to provide in at least one further partial section of the second longitudinal section 35 a circularly ground land that is, preferably, wider than the circularly ground land 29 of the first longitudinal section. By means of this combination of sharpening and wide circularly ground land in the second longitudinal section 35 of the secondary cutting edge 19, 19', it is possible to achieve very good cutting as well as supporting action.

Overall, it can be seen that it is especially preferred to always provide a circularly ground land 29 in the first longitudinal section 31 of the secondary cutting edge 19, 19', which is very narrow and has a preferred length L of 1.0 mm to 3.0 mm, and wherein, in the second longitudinal section 35, the transition from the secondary cutting edge 19, 19' to the secondary flank 37 differs from the transition of the secondary cutting edge 19, 19' to the flank 33 in the first longitudinal section 31.

Consequently, the short and narrow circularly ground land 29 in the first longitudinal section 31 is essential, as well as the fact that the transitions as described above in the first longitudinal section 31 and the second longitudinal section 35 are different from one another because this is the only way that the second longitudinal section 31 makes a considerable contribution to the quality of the produced bore hole.

The invention claimed is:

1. A drill for producing a bore hole in work pieces containing fiber-reinforced plastic, the drill comprising:
    at least one end-face main cutting edge;
    at least one secondary cutting edge provided in a region of a circumferential surface of the drill;
    at least one circularly ground land circumferentially adjoining the at least one secondary cutting edge, the circularly ground land extending over a first longitudinal section in a front region of the secondary cutting edge without extending into a secondary longitudinal section adjoining the first longitudinal section; and
    a secondary flank circumferentially adjoining the secondary cutting edge, the secondary flank in the secondary longitudinal section.

2. The drill according to claim 1, wherein a transition from the secondary cutting edge to the secondary flank is configured as sharpened in the second longitudinal section.

3. The drill according to claim 1, wherein the at least one end-face main cutting edge includes at least two main cutting edges, wherein the at least one secondary cutting edge includes at least two secondary cutting edges, and wherein each of the main cutting edges is associated with a secondary cutting edge.

4. The drill according to claim 1, wherein the circularly ground land has a width of approximately 0.01 mm to approximately 0.1 mm.

5. The drill according to claim 1, wherein the circularly ground land has a width of approximately 0.05 mm.

6. The drill according to claim 1, further comprising a high-hardness coating at least in a region including the circularly ground land.

7. The drill according to claim 1, further comprising a diamond coating at least in a region including the circularly ground land.

8. The drill according to claim 1, wherein a length of the circularly ground land is approximately 1 mm to approximately 3 mm.

9. The drill according to claim 1, wherein a width of the circularly ground land is essentially constant over a length thereof.

10. The drill according to claim 1, wherein a width of the circularly ground land narrows from a face-end region of the first longitudinal section against a drilling direction of the drill.

11. The drill according to claim 1, wherein each secondary cutting edge is provided with at least one open recess.

12. The drill according to claim 1, wherein each secondary cutting edge is provided with at least one notch.

13. The drill according to claim 11, wherein each secondary cutting edge is provided with several recesses that are disposed at a distance relative to each other and open toward the edge.

14. The drill according to claim 13, wherein a longitudinal extension of the recess is approximately 0.1 mm to approximately 0.8 mm.

15. The drill according to claim 13, wherein a longitudinal extension of the recess is approximately 0.1 mm to approximately 0.5 mm.

16. The drill according to claim 13, wherein a longitudinal extension of the recess is approximately 0.15 mm.

17. The drill according to claim 13, wherein the at least one recess is disposed on the secondary cutting edge in the region of the second longitudinal section of the secondary cutting edge.

18. The drill according to claim 1, wherein the main cutting edge extends essentially parallel in relation to a straight line intersecting an axis of rotation of the drill and is at a distance advancing in a direction of rotation of the drill in relation to the straight line of 10% to 20% of a main bore hole diameter of the drill.

19. The drill according to claim 1, wherein the at least one end-face main cutting edge includes at least two main cutting edges, and wherein the main cutting edges enclose a point angle that is smaller than or equal to 100°.

20. The drill according to claim 1, wherein the at least one end-face main cutting edge includes at least two main cutting edges, and wherein the main cutting edges enclose a point angle that is smaller than or equal to 90°.

21. The drill according to claim 1, further comprising an end-face pointing.

22. The drill according to claim 1, further comprising a chip groove associated with the at least one secondary cutting edge, an extra groove provided at least regionally in the chip groove such that a rake angle of the at least one secondary cutting edge is enlarged in the region of the extra groove.

23. The drill according to claim 22, wherein the extra groove is provided on the at least one secondary cutting edge to which adjoins a circularly ground land.

24. The drill according to claim 22, wherein the extra groove is disposed in a region of the circularly ground land as viewed in an axial direction.

25. The drill according to claim 1, wherein the at least one end-face main cutting edge includes at least two main cutting edges that extend toward each other from a circumference of the drill and connect to each other to form a chisel edge, and wherein an entire portion of the at least two main cutting edges includes an axial component extending in a direction toward a distal end face of the drill.

26. A drill for producing a bore hole in work pieces containing fiber-reinforced plastic, the drill comprising:
   at least one end-face main cutting edge;
   at least one secondary cutting edge provided in a region of a circumferential surface of the drill;
   at least one circularly ground land circumferentially adjoining the at least one secondary cutting edge, the circularly ground land extending over a first longitudinal section in a front region of the secondary cutting edge; and
   a secondary flank circumferentially adjoining the secondary cutting edge, the secondary flank in a secondary longitudinal section adjoining the first longitudinal section, wherein a transition from the secondary cutting edge to the secondary flank is configured as sharpened in the second longitudinal section.

\* \* \* \* \*